(12) United States Patent
Naberhuis et al.

(10) Patent No.: US 7,431,488 B2
(45) Date of Patent: *Oct. 7, 2008

(54) LIGHT GUIDE DISPLAY WITH ANTIREFLECTION FILM

(75) Inventors: Steven L Naberhuis, Palo Alto, CA (US); Huei Pei Kuo, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/082,439

(22) Filed: Mar. 17, 2005

(65) Prior Publication Data

US 2006/0209565 A1    Sep. 21, 2006

(51) Int. Cl.
*G02B 6/00* (2006.01)

(52) U.S. Cl. .......................... 362/556; 362/616; 362/622

(58) Field of Classification Search ............... 362/608, 362/609, 616, 621, 622, 623, 624, 627, 628, 362/554, 583, 556; 385/115, 116, 117, 118, 385/119, 120, 121

See application file for complete search history.

(56) References Cited

U.S. PATENT DOCUMENTS

| 3,043,910 | A | * | 7/1962 | Hicks, Jr. ..................... 385/121 |
| 4,929,048 | A | | 5/1990 | Cuypers |
| 4,932,747 | A | * | 6/1990 | Russell et al. ................ 385/115 |
| 5,276,758 | A | * | 1/1994 | Hughes ....................... 385/119 |
| 5,400,424 | A | | 3/1995 | Williams |
| 5,508,892 | A | * | 4/1996 | Laczynski et al. ............. 362/583 |
| 6,208,788 | B1 | * | 3/2001 | Nosov ......................... 362/554 |
| 6,379,788 | B2 | | 4/2002 | Choi et al. |
| 6,474,826 | B1 | * | 11/2002 | Tanaka et al. ................. 362/612 |
| 6,760,155 | B2 | | 7/2004 | Murayama et al. |
| 7,256,951 | B2 | * | 8/2007 | Naberhuis et al. ............ 385/115 |

* cited by examiner

*Primary Examiner*—Y My Quach Lee

(57) ABSTRACT

Provided is a light guide display with an antireflection film. A plurality of aligned magnifying layers provide a viewing surface. Each magnifying layer includes a plurality of aligned light guides, each light guide having an input end, a midsection and an output end. The plurality of output ends are aligned. The plurality of input ends are aligned as an input surface. A antireflection film is disposed upon the input surface. A related method of making a light guide screen with an antireflection film is also provided.

25 Claims, 6 Drawing Sheets

LIGHT GUIDE DISPLAY WITH ANTIREFLECTION FILM

RELATED APPLICATIONS

This application is related to commonly owned U.S. patent application Ser. No. 10/698,829, filed on Oct. 31, 2003, by inventors Huei Pei Kuo, Lawrence M. Hubby, Jr. and Steven L. Naberhuis and entitled "Light Guide Apparatus For Use In Rear Projection Display Environments," herein incorporated by reference.

FIELD

This invention relates generally to the field of display devices, and more particularly, to screens and related hardware employed in rear projection display devices.

BACKGROUND

Socially and professionally, most people rely upon video displays in one form or another for at least a portion of their work and/or recreation. With a growing demand for large screens, such as high definition television (HDTV), cathode ray tubes (CRTs) have largely given way to displays composed of liquid crystal devices (LCDs), plasma display panels (PDPs) or front or rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a back-lit, light modulating liquid crystal device.

As neither system utilizes a large tube, LCD and PDP screens may be quite thin and often are lighter than comparable CRT displays. However, the manufacturing process for LCDs, PDPs and most other flat panel displays is much more complex and intensive with respect to both equipment and materials than that of CRTs, typically resulting in higher selling prices.

Projection systems offer alternatives to PDP and LCD based systems. In many cases, projection display systems are less expensive than comparably sized PDP or LCD display systems. Rear projection display systems typically employ a wide angle projection lens (or multiple lenses), operating in connection with one or more reflective surfaces to direct light received from the projector through the lens(es) to the back of a screen. The lens and mirror arrangement typically enlarges the image as well.

To accommodate the projector, one or more lenses, and reflectors, rear projection displays are typically 18 to 20 inches deep and not suitable for on-wall mounting. A typical rear projection system offering a 55-inch HDTV screen may weigh less than a comparable CRT, but at 200+ pounds it may be difficult and awkward to install and support.

Often, rear projection display devices exhibit average or below average picture quality in certain environments. For example, rear projection displays may be difficult to see when viewed from particular angles within a room setting or when light varies within the environment. Aside from a theatrical setting, light output and contrast is a constant issue in most settings and viewing environments.

Despite advancements in projectors and enhanced lens elements, the lens and reflector design remains generally unchanged and tends to be a limiting factor in both picture quality and overall display system thickness.

A developing variation of rear projection displays utilizes light guides, such as optical fibers, to route an image from an input location to an output location and to magnify the image. Such displays may be referred to as light guide screens (LGS's). However, in certain configurations, light guide screens may lose a percentage of light and, thus, the brightness of the image.

Weight, thickness, durability, cost, aesthetic appearance and quality are key considerations for rear projection display systems and display screens. From the manufacturing point of view, cost of production and increased yield are also important.

Hence, there is a need for a rear projection display that overcomes one or more of the drawbacks identified above.

SUMMARY

This invention provides an antireflection film for the input surface of light guide screen displays.

In particular, and by way of example only, according to an embodiment of the present invention, provided is a light guide display with antireflection film including: a plurality of aligned magnifying layers providing a viewing surface, each magnifying layer including; a plurality of aligned light guides, each light guide having an input end, a midsection and an output end; the plurality of output ends aligned; the plurality of input ends aligned as an input surface, and an antireflection film disposed upon the input surface.

DETAILED DESCRIPTION

Before proceeding with the detailed description, it is to be appreciated that the present teaching is by way of example, not by limitation. The concepts herein are not limited to use or application with a specific light guide screen. Thus, although the instrumentalities described herein are for the convenience of explanation, shown and described with respect to exemplary embodiments, it will be appreciated that the principles herein may be equally applied in other types of light guide screen display systems.

Figure 1:
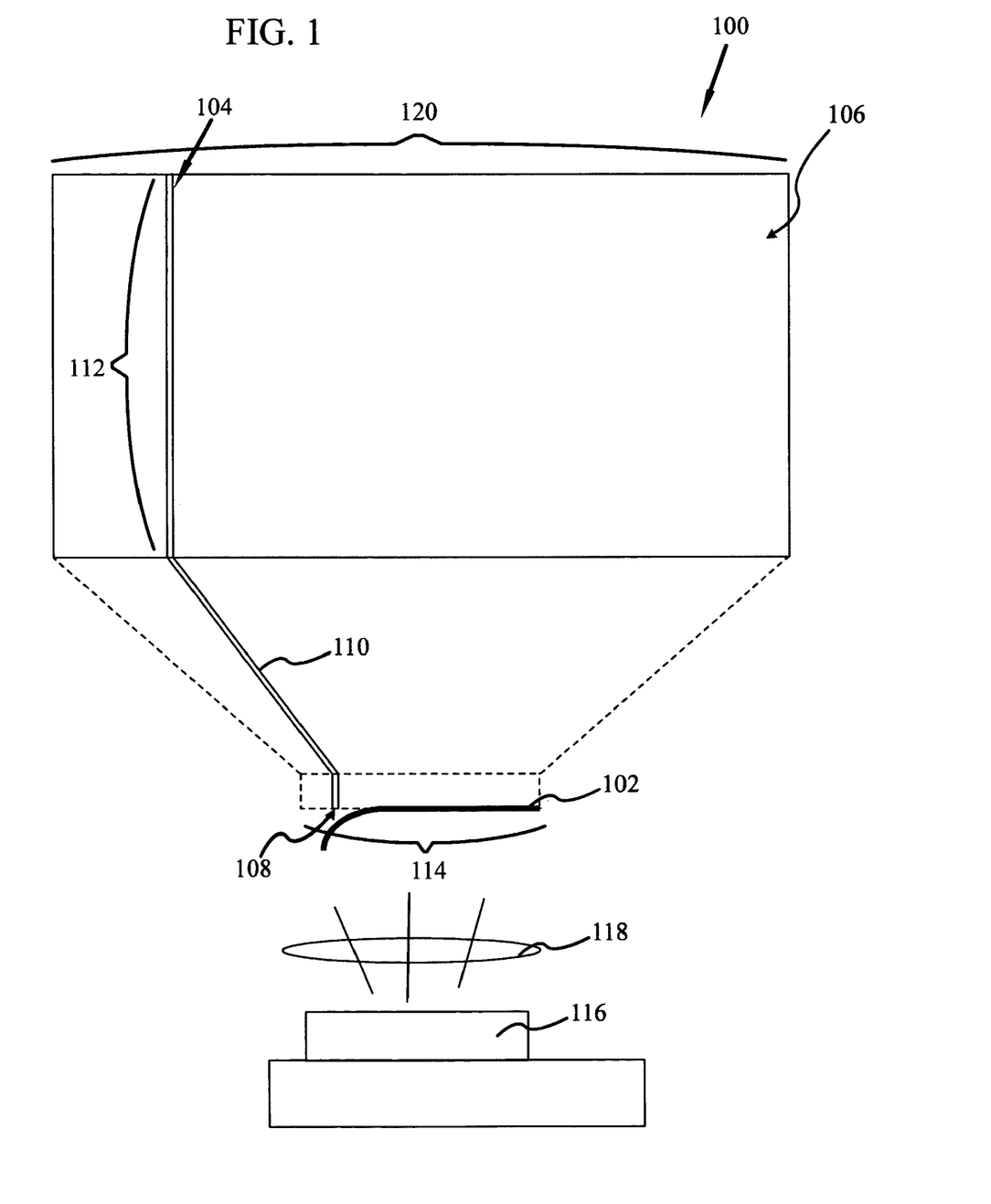
FIG. 1 a schematic diagram of a light guide screen with an antireflection film according to an embodiment.

Referring now to the drawings, and more specifically to FIG. 1, there is shown a portion of a light guide screen display 100 (hereinafter, "LGS 100") with an antireflection film 102. In at least one embodiment, LGS display 100 has a plurality of aligned magnifying light guide layers 104 (hereinafter, "magnifying layers 104"), providing a viewing surface 106. Each magnifying layer 104 provides an input location 108, a midsection 110 and an output location 112. Whereas FIG. 1 illustrates a single magnifying layer 104, for ease of discussion and introduction of the elements, FIG. 7 may be referred to as a more complete rendering of the LGS 100 with a plurality of magnifying layers 104.

As shown, in at least one embodiment, each magnifying layer is a continuous vertical slice across the viewing surface 106 of LGS 100. In an alternative configuration (not shown), each magnifying layer 104 is a continuous horizontal slice across the viewing surface 106 of LGS 100. In at least one embodiment, collectively, input locations 108 of each magnifying layer 104 provide input surface 114. Collectively, output locations 112 of each magnifying layer 104 provide output face 120.

Antireflection film 102 is illustrated as an exaggeratedly thick line pulled back on the left side to aid in identifying input location 108. It is to be understood and appreciated that antireflection film 102 is actually quite thin. Moreover, antireflection film 102 is intimately joined to input surface 114.

An image is projected upon the antireflection film 102 joined to input surface 114. Such an image may be provided in at least one embodiment by an image source 116, proximate to the antireflection film 102 joined to input surface 114. A lens 118 may optically couple the at least one image source to the antireflection film 102 joined to input surface 114, or the lens 118 may be an integral part of image source 116.

Image source 116 may be any device capable of providing a visual image, such as, for example, a projector. Image source 116 is not limited simply to this example, and may also include combinations of devices. For example, multiple light/image sources (such as red, green and blue illuminated liquid crystal light valves) may be used as well. As is further explained below, the image focused upon the input surface 114 is expanded to appear upon the viewing surface 106.

Figures 2, 3:
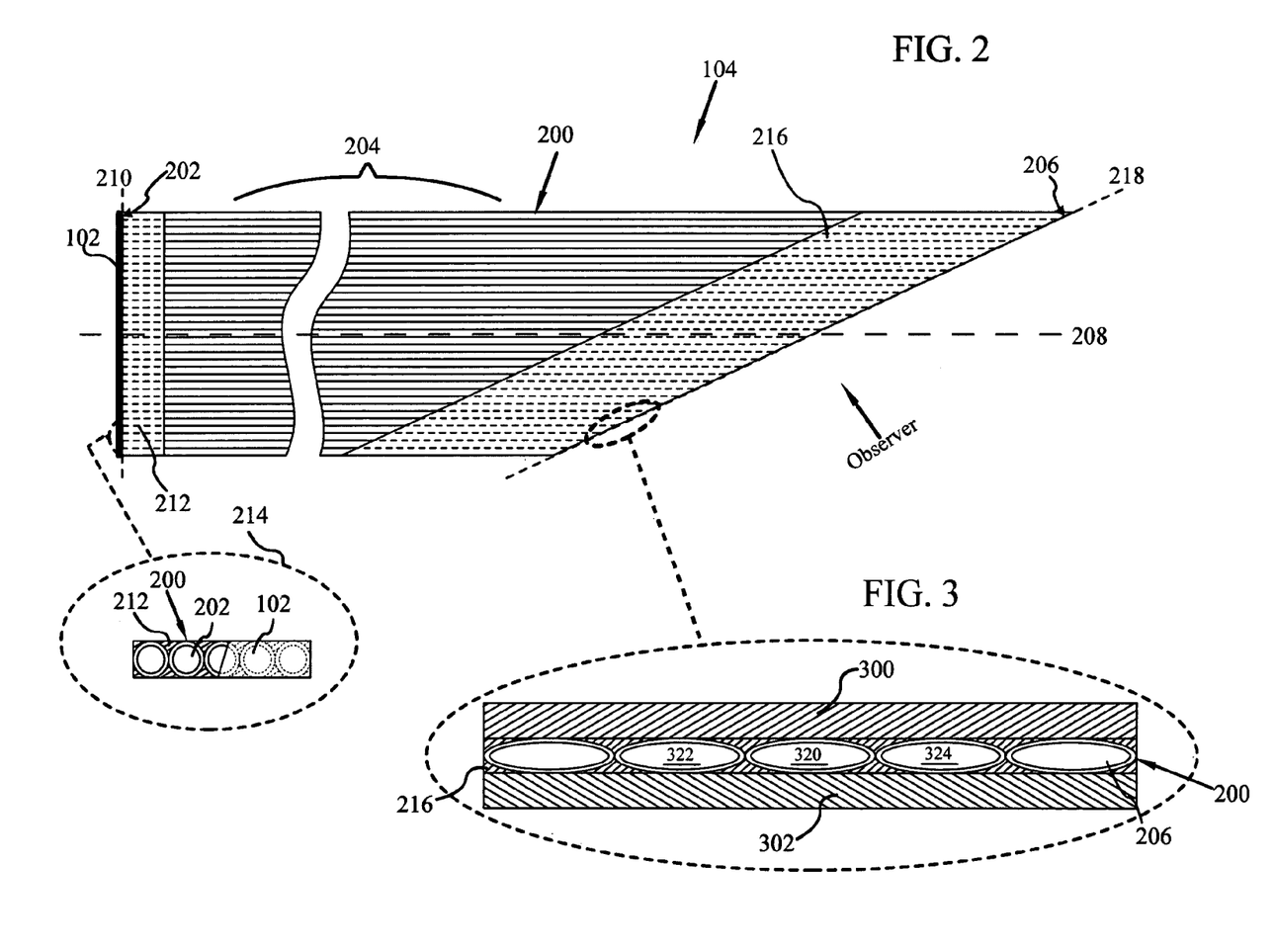
FIG. 2 is a plane view of a magnifying layer with antireflection film incorporated in the display shown in FIG. 1.
FIG. 3 is a partial cross section view of the output ends of the light guides shown in FIG. 2.

As shown in FIG. 2, each magnifying layer 104 has a plurality of light guides 200. Each light guide 200 consists of a core that is substantially optically clear and a circumferential cladding, further discussed below with respect to FIG. 5. The core has an index of refraction, n1, and the clad has an index of refraction n2, wherein n1>n2. In at least one embodiment, each light guide 200 is an optical fiber; more specifically, a cladded optical fiber.

Each light guide 200 has an input end 202, a midsection 204 and an output end 206. The light guides 200 are arranged parallel to longitudinal centerline 208 of magnifying layer 104. Each light guide 200 is configured such that an image presented to the input end 202 is magnified at the output end 206. More specifically, in at least one embodiment, the output end 206 is configured to magnify an image presented to the input end 202.

In at least one embodiment, the midsection 204 is a flexible midsection. As such, it is understood and appreciated that magnifying layer 104 may bend and twist such that longitudinal centerline is not always a straight line; however, magnifying layer 104 has been illustrated as substantially flat and straight for ease of discussion.

The plurality of input ends 202 are aligned and, in at least one embodiment, the aligned input ends 202 define a portion of dotted line 210. It is this portion of line 210 that serves as the input location 108 of magnifying layer 104 shown in FIG. 1. In addition, in at least one embodiment, this portion of line 210 is transverse (in at least one embodiment perpendicular) to longitudinal centerline 208. When the magnifying layers 104 are stacked, the aligned input ends provide an input surface 114 (see FIG. 1 and FIG. 7). Bonding material 212 (e.g. glue) bonds the aligned input ends 202.

An enlarged partial end view of magnifying layer 104 is shown bounded by dotted line 214 to further illustrate bonding material 212 and a portion of antireflection layer 102. Those input ends 202 beneath antireflection film 102 are shown in dotted relief.

In at least one embodiment, the plurality of output ends 206 are aligned in substantially contiguous parallel contact, without intervening spacers or material separating each individual output end 206 from its neighbors on either side. In outer words, the output ends 206 lie next to one anther and are in actual contact, touching along their outer surfaces at one or more points. Likewise, in at least one embodiment, the plurality of input ends 202 are aligned in substantially contiguous parallel contact, without intervening spacers or material separating each individual input end 202 from its neighbors on either side. In other words, the input ends 202 lie next to one another and are in actual contact, touching along their outer surfaces at one or more points.

As is further illustrated and described below with reference to FIG. 5 (illustrating light guide core 500 and clad 502), it is understood and appreciated that the light conveying cores of each optical fiber are not in contact; rather, it is the cladded outer surfaces that are in contact. Moreover, over the course of each entire length, the core of one light guide 200 will not contact the core of another light guide 200.

FIG. 2 illustratively shows thirty-three light guides 200 for ease of discussion and conceptualization. Embodiments may employ more or fewer light guides 200. In at least one embodiment, light guides 200 are always in substantially contiguous parallel contact, particularly at the aligned input ends 202 providing input surface 114, and at the aligned output ends 206. However, due to limitations in manufacturing, instances may arise where a small amount of space might exist between one or more light guides 200. However, the majority of light guides 200 are intended to be in substantially contiguous parallel contact. The midsections 204 of each light guide 200 may not necessarily be in contiguous contact.

In at least one embodiment, bonding material 216 (e.g. glue) is disposed adjacent to output ends 206 bonding output ends 206 into a uniform line defining a portion of dashed line 218. Bonding material 216 may be substantially the same as bonding material 212.

In contrast to input ends 202 defining a portion of line 210, the portion of line 218 defined by output ends 206 is usually not perpendicular to longitudinal centerline 208. More specifically, the dotted line 218 as defined by output ends 206 is angled relative to longitudinal centerline 208.

FIG. 3 illustrates a partial enlarged view of five output ends 206 shown in FIG. 2. As illustrated, in at least one embodiment, a top spacer 300 and a bottom spacer 302 are bonded to light guides 200 proximate to the output ends 206. The substantially contiguous parallel contact between the output ends 206 of light guides 200 may also be more fully appreciated. As shown, light guide 320 is in intimate contact with light guide 322, lying to the left, and light guide 324, lying to the right.

FIG. 1 does not illustrate the individual light guide elements of each magnifying layer 104; however, the uniform line of magnifying output ends 206 corresponds to output location 112 shown in FIG. 1. The midsections 204 collectively are represented as midsection 110, and, as shown in FIG. 1, permit separate orientation/positioning of the input surface 114 from the aligned output location 112. Where, as in at least one embodiment, the midsections 204 of light guides 200 are flexible, the midsections 110 of each magnifying layer 104 are also flexible.

Figure 4:
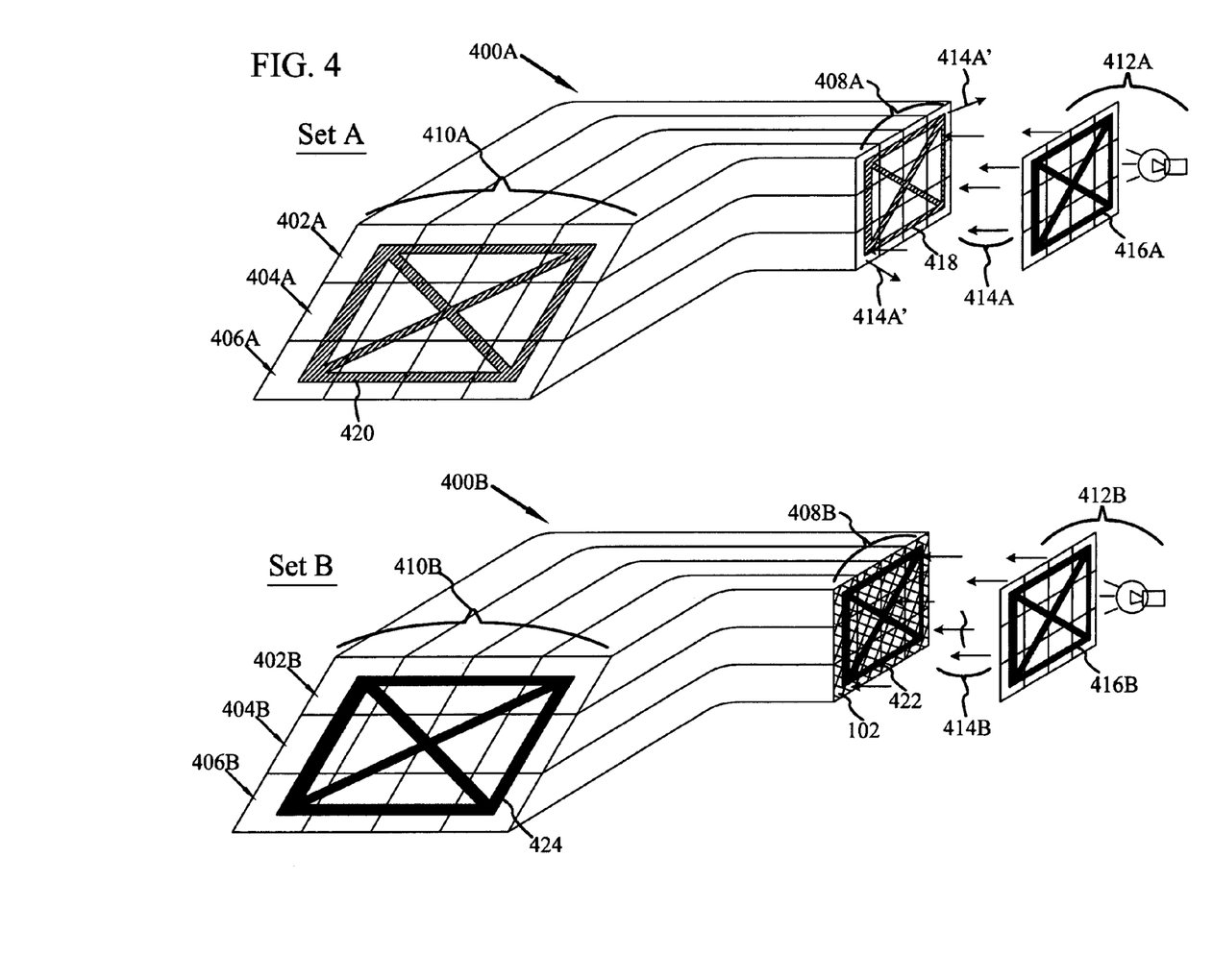
FIG. 4 is a schematic illustration of advantageous properties achieved with the antireflection film disposed upon the input surface in accordance with an embodiment.

FIG. 4 conceptually illustrates the advantageous properties imparted to LGS 100 by antireflection film 102. For simplicity of illustration and discussion, with respect to FIG. 4, two sets 400A, 400B of stacked magnifying layers of light guides are shown without spacers, cladding or bonding materials, as discussed above. In addition, whereas the above figures illustrate the ribbon sections as flat and unbent, in the perspective view of FIG. 4, the ribbon sections are depicted as bent so as to show the relative effect of the magnification and intensity of the output image.

Set 400A includes stacked magnifying layers 402A, 404A, 406A. Set 400B includes stacked ribbon sections 402B, 404B, 406B. Each set 400A, 400B has an input surface 408A, 408B and a magnifying output end 410A, 410B respectively. Image source 412A/B provides substantially the same image 416A/B to the input surface 408A, 408B of each set 400A, 400B.

When light is incident upon a boundary between two media, such as air and the light guide material establishing input surface 408A, 408B, some light is reflected as the light passes from the first media (air) into the second media (the input surface 408A, 408B). The amount of light reflected is dependent upon the difference of index of refraction between the two media. The amount of light reflected increases as the disparity between the two refractive indices increases.

Bare surface reflections are called Fresnel losses from the equation that is used to calculate them. Reflectance (R) from a single bare surface (e.g. the input surface) in air is given by:

$$R = ((n_i - n_a)/(n_i + n_a))^2$$

where $n_i$ is the index of refraction of the material comprising the input surface and $n_a$ is the index of refraction for air. Different materials frequently have different refractive indexes. With respect to these differences and the above equation, the loss of light due to reflection from one surface may be appreciated as follows:

| Material | Refractive Index | Reflection Loss From One Surface |
| --- | --- | --- |
| CR39 Plastic | 1.49 | 3.87% |
| Glass | 1.51714 | 4.22% |
| Glass, Albite | 1.489 | 3.86% |
| Glass, Crown | 1.52 | 4.26% |
| Glass, Crown Zinc | 1.517 | 4.22% |
| Glass, Flint, Dense | 1.66 | 6.16% |
| Glass, Flint, Light | 1.58 | 5.05% |
| Glass, Flint, Medium | 1.62725 | 5.70% |
| Mid-Index Plastic | 1.56 | 4.79% |
| Plastic | 1.46 | 3.50% |
| Plexiglas | 1.5 | 4.00% |
| Polycarbonate | 1.59 | 5.19% |

There are three generally accepted types of antireflection coatings in general use: A) single-layer coatings, B) multi-layer broadband dielectric coatings and C) multilayer narrow-band V coatings. Antireflection coatings are typically extremely thin layers of material.

The working of an antireflection coating can be exemplified by a single-layer coating. The introduction of a coating that is intimately coupled optically to the bare surface mentioned above creates an additional interface. Reflections occur at both the air/coating interface and the coating/input-face interface. Assuming the index of refraction of the coating is $n_c$, the reflectance of the composite interface at normal incidence with the thickness of the coating being $\lambda/4$, where $\lambda$ is the design wavelength or wavelength being optimized for peak performance, is given by, $$R_t = 2(n_c^2 - n_a n_i)/((n_c + n_a)(n_i + n_c))$$

where $R_t$ is made to be less than R with judicious selections of $n_c$. At normal incidence, the maximum cancellation of reflection through destructive interference is achieved using a coating with $n_c = (n_i \times n_a)^{1/2}$. For fairly uniform R in the visible, $\lambda$ is usually chosen in the green at 550 nm.

Magnesium fluoride ($MgF_2$) is perhaps the most common material used for singe-layer antireflection coatings. A properly designed and established antireflection coating will reduce reflections to between 1% and 2% per surface for normal incidence—a noted improvement over the values in the above table. Broadband multilayer dielectric coatings can reduce average reflectivity to approximately 0.5% per surface. A typical broadband multilayer antireflection coating will consist of at least six thin-film layers. Narrow-band V coatings typically provide less than 0.25% reflection, but only at a specific designated wavelength.

Antireflection coatings reduce the light loss due to reflection by making use of phase changes and the dependence of reflectivity on the index of refraction. A single layer antireflection coating as described previously can be made non-reflective only at one wavelength, usually selected to be the middle (e.g., green at 550 nm) of the visible spectrum. For example, assume that reflectance at 550 nm can be reduced to 1% from 4% through the use of a single layer, in which case it is likely that reflectance in the red and blue will be reduced to approximately 2%. Broadband multilayer antireflection coatings are more effective over the entire spectrum.

With respect to FIG. 4, set 400A illustrates an input surface 408A that does not have an antireflection film applied. As such, a portion of the light (illustrated as arrows 414A) provided by image source 412A is therefore reflected back (illustrated as arrows 414A') from the input surface 408A and is not conducted by the magnifying layers 402A, 404A, 406A to the magnifying output end 410A. As a result, the image 418 received by input surface 408A, and transmitted to output face 410A had diminished in intensity due to the loss of reflected light 414A. Moreover, the brightness and contrast of the resulting displayed image 420 provided to the user are potentially diminished.

Set 400B illustrates an input surface 408B that has an antireflection film 102 applied (represented as cross hatching on input surface 408B). As such, a greater percentage of the light 414B provided by image source 412B is received by the input surface 408B and conducted by the magnifying layers 402B, 404B, 406B to the magnifying output end 410B. The image 422 received by input surface 408B and transmitted to output face 410B as image 424 is superior to image 420. Moreover, the antireflection film 102 enhances the optical coupling of the image source 412B to the input surface 408B. The brightness and contrast of the resulting displayed image 424 provided to the user are advantageously improved.

In at least one embodiment, antireflection film 102 is provided as a single layer of material having an index of refraction between the index of refraction of the light guides 200 and the index of refraction of air. More specifically, in at least one embodiment, antireflection film 102 is a single layer of Magnesium fluoride ($MgF_2$). In an alternative embodiment the antireflection film 102 may be a layer of polytetrafluoroethylene—commonly referred to as PTFE (Teflon™), or clear silicone on an acrylic or appropriate plastic sheet that matches the index of refraction of the light guide cores. In at least one alternative embodiment, antireflection film 102 is a broadband multilayer such as, for example, the commercially available Melles Griot HEBBAR™ coating or like coatings from OCLI (Optical Coating Laboratory, Inc. of Santa Rosa, Calif.).

So as to provide the greatest uniformity and integrity of antireflection film 102, in at least one embodiment, antireflection film 102 is disposed upon the input surface 114 after the magnifying layers have been fabricated and stacked. While in an alternative embodiment the antireflection film 102 may be applied to each light guide prior to the fabrication of a magnifying layer 104 (or in an yet another alternative embodiment to the aligned input ends 202 of each magnifying layer 104), as each magnifying layer 104 is fabricated, subsequent fabrication processes in establishing LGS 100 may inadvertently damage the antireflection film 102.

Antireflection films are typically established in a high vacuum involving physical vapor deposition (PVD) or chemical vapor deposition (CVD). A vapor deposition process is one in which materials in a vapor state are condensed through condensation processes including chemical reaction and conversion from and to a solid material.

Vapor deposition processes typically take place within a vacuum chamber. In a PVD process, the surface to be coated is subjected to a plasma bombardment such as by a sputtering or evaporation process. In a CVD process, thermal energy heats gasses in the coating chamber and drives the deposition reaction to coat the intended surface.

In at least one embodiment, antireflection film 102 is disposed upon input surface 114 by physical vapor deposition. In at least one alternative embodiment, antireflection film 102 is disposed upon input surface 114 by chemical vapor deposition. Moreover, in at least one embodiment, antireflection film 102 is a coating applied to input surface 114. For either PVD or CVD, the input surface 114 is presented to a vacuum coating chamber appropriate for the type of process to be performed. Such processes are well understood in the art. The selection of PVD over CVD is a choice determined by fabrication processes and the materials intended for use in providing the antireflection film 102.

In yet another alternative embodiment, antireflection film 102 is an adhesive laminate disposed upon input surface 114. Moreover, in at least one embodiment, antireflection film 102 is a film applied to the input surface 114. Fabrication processes may be simplified when the antireflection film 102 is provided as an adhesive laminate. An example of such a laminate is the PTFE-coated acrylic sheet described previously.

Regardless of whether antireflection film 102 is provided by PVD, CVD or as an adhesive laminate, to reduce the possibility of additional boundaries, antireflection film 102 is intimately joined to the input surface 114. Antireflection film 102 is non-separable from input surface 114. Moreover, in at least one embodiment, antireflection film 102 is an integral component of input surface 114.

Figures 5, 6:
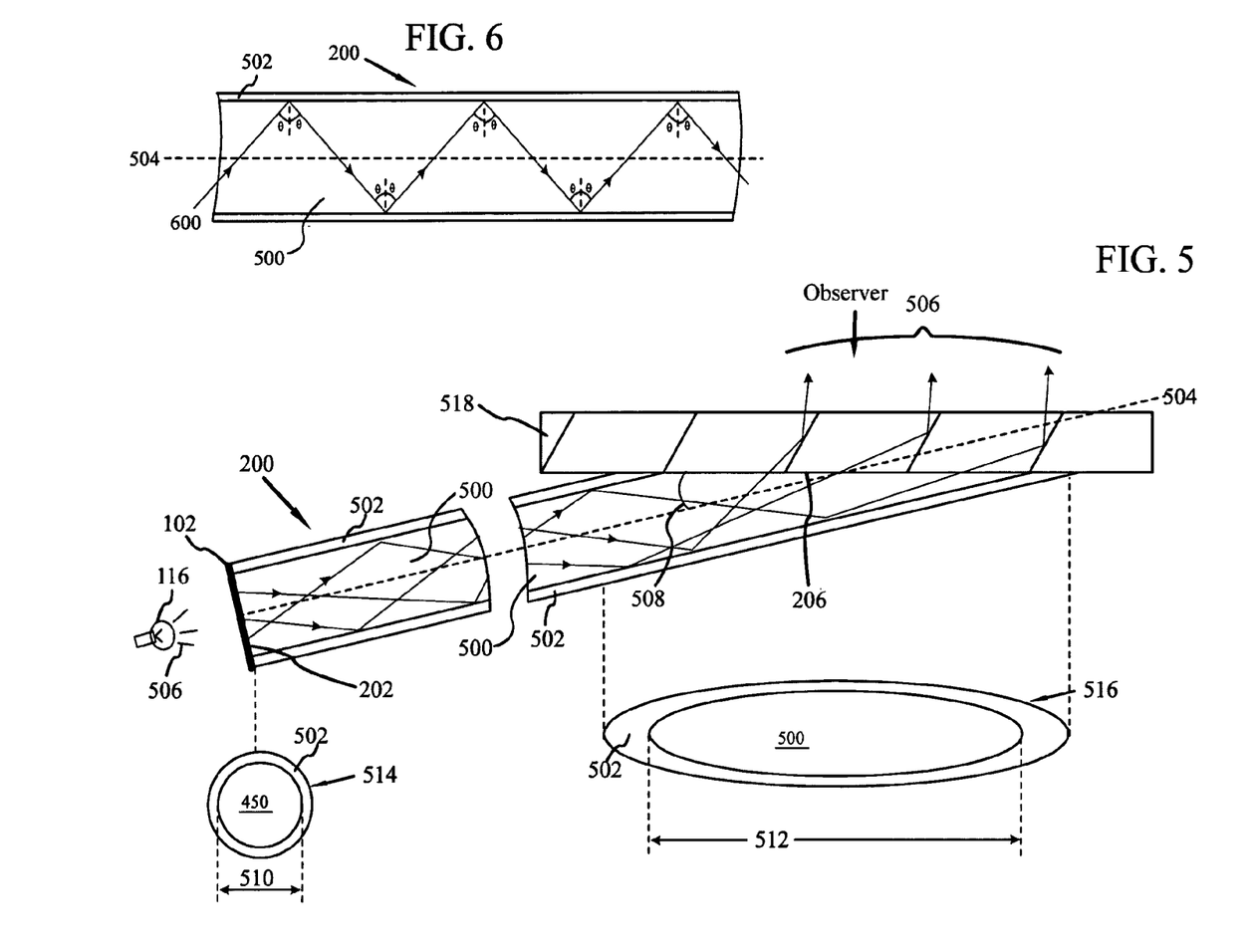
FIG. 5 is a partial cross sectional view of a light guide with a portion of the antireflection film as introduced in FIG. 2.
FIG. 6 is an enlarged partial cross section illustrating TIR within the light guide shown in FIG. 5.

FIG. 5 conceptually illustrates an enlarged cross-section of a single light guide 200 and a portion of antireflection film 102. Although illustrated as having a circular cross section, other light guide geometries may be employed, such as, but not limited to, triangular, rectangular or hexagonal.

In at least one embodiment, the light guides 200 comprising the magnifying layers 104 of LGS 100 each have a longitudinal light guide core 500 and an external circumferential clad 502. It is, of course, realized that light guide 200 may bend, coil or otherwise contour such that it may not always lie in a straight line along longitudinal centerline 504. However, light guide 200 is shown as straight for ease of discussion and illustration.

In at least one embodiment, the core 500 is formed of a generally optically clear plastic or plastic-type material, including but not limited to a plastic such as acrylic, Plexiglas, polycarbonate material and combinations thereof. In an alternative embodiment, the core 500 is formed of a generally optically clear glass.

In at least one embodiment, each light guide 200 is preferably substantially totally internally reflecting such that the light, illustrated as lines 506, received at the input end 202 is substantially delivered to the magnifying output end 206 with minimal loss. Clad 502 is a material having a refraction index lower then that of the core 500. Total internal reflection, or TIR, is the reflection of all incident light off a boundary between clad 502 and core 500. TIR occurs when a light ray is both in a medium of higher index of refraction and approaches a medium of lower index of refraction, and the angle of incidence for the light ray is greater than the "critical angle."

The critical angle is defined as the smallest angle of incidence measured with respect to a line normal to the boundary between two optical media for which light is refracted at an exit angle of 90 degrees—that is, the light propagates along the boundary—when the light impinges on the boundary from the side of higher index of refraction. For any angle of incidence greater than the critical angle, the light traveling through the medium with a higher index of refraction will undergo total internal reflection. The value of the critical angle depends upon the combination of materials present on each side of the boundary.

FIG. 6 is an enlarged portion of light guide 200 provided to further illustrate the possible propagation of light ray 600. Light ray 600 travels in light guide 200 through successive TIR, as shown in FIG. 6. The angle of incidence and reflection remains unchanged at angle Θ until such time as light ray 600 is delivered to the output end, not shown in FIG. 6.

As shown in FIG. 5, input end 202 is substantially perpendicular to longitudinal centerline 504. Magnifying output end 206 is angled relative to longitudinal centerline 504, at angle 508. As such, the horizontal width 510 of input end 202 is not as great as the horizontal width 512 of magnifying output end 206.

In the embodiment shown, input end 202 has a substantially circular cross-section 514, while the magnifying output end 206 has a substantially elliptical cross-section 516. In at least one alternative embodiment, light guides 200 may have cross-sections relating to a square, triangle, octagon or other polygon.

As light guides 200 are TIR in at least one embodiment, antireflection film 102 enhances the delivery of light 506 from image source 116 into input end 202. The greater the amount of light received at input end 202 and not reflected, the greater the amount of light delivered to the output end 206.

Within a typical light guide 200 such as, for example, an optical fiber, the spread of light to either side of longitudinal centerline 504 is typically about thirty degrees (30°). Although the angle of output end 206 may provide a flat surface transverse to an observer, exiting light will continue substantially in the direction last suggested by longitudinal centerline 504 unless reflected or refracted at output end 206.

In at least one embodiment where such redirection is desired, such redirection of light is accomplished with a light redirection layer. In at least one embodiment the light redirection layer is a louver layer 518. A method for making a louver layer 518 is described in patent application Ser. No.

11/052,612, filed Feb. 7, 2005, entitled "Method of Making A Louver Device for A Light Guide Screen," which is herein incorporated by reference. Various types of louver layers 518 are described in patent application Ser. No. 11/052,605, filed Feb. 7, 2005, entitled "Holographic Louver Device for A Light Guide Screen," which is herein incorporated by reference.

In a typical display screen, visual images are represented by a plurality of individual light points, commonly referred to as pixels. Each pixel may provide the same or different light as its neighbor pixels. As a whole, it is the patterns established by the varying lights provided by the pixels that are perceived by observers as shapes, pictures and images.

Due to the small size of each pixel and/or the distance between the observer and the display, the independent nature of each pixel is not observed or perceived by the unaided eye. A typical standard TV display provides a vertical-to-horizontal resolution of 480:640 with about 307,200 pixels. A typical HDTV screen provides a vertical-to-horizontal resolution of 1080:1920 with about 2,116,800 pixels—a more than sixfold increase in pixels over a traditional TV display. With respect to LGS 100, in at least one embodiment, each display pixel is provided by at least one output end 206 of each light guide 200.

Figure 7:
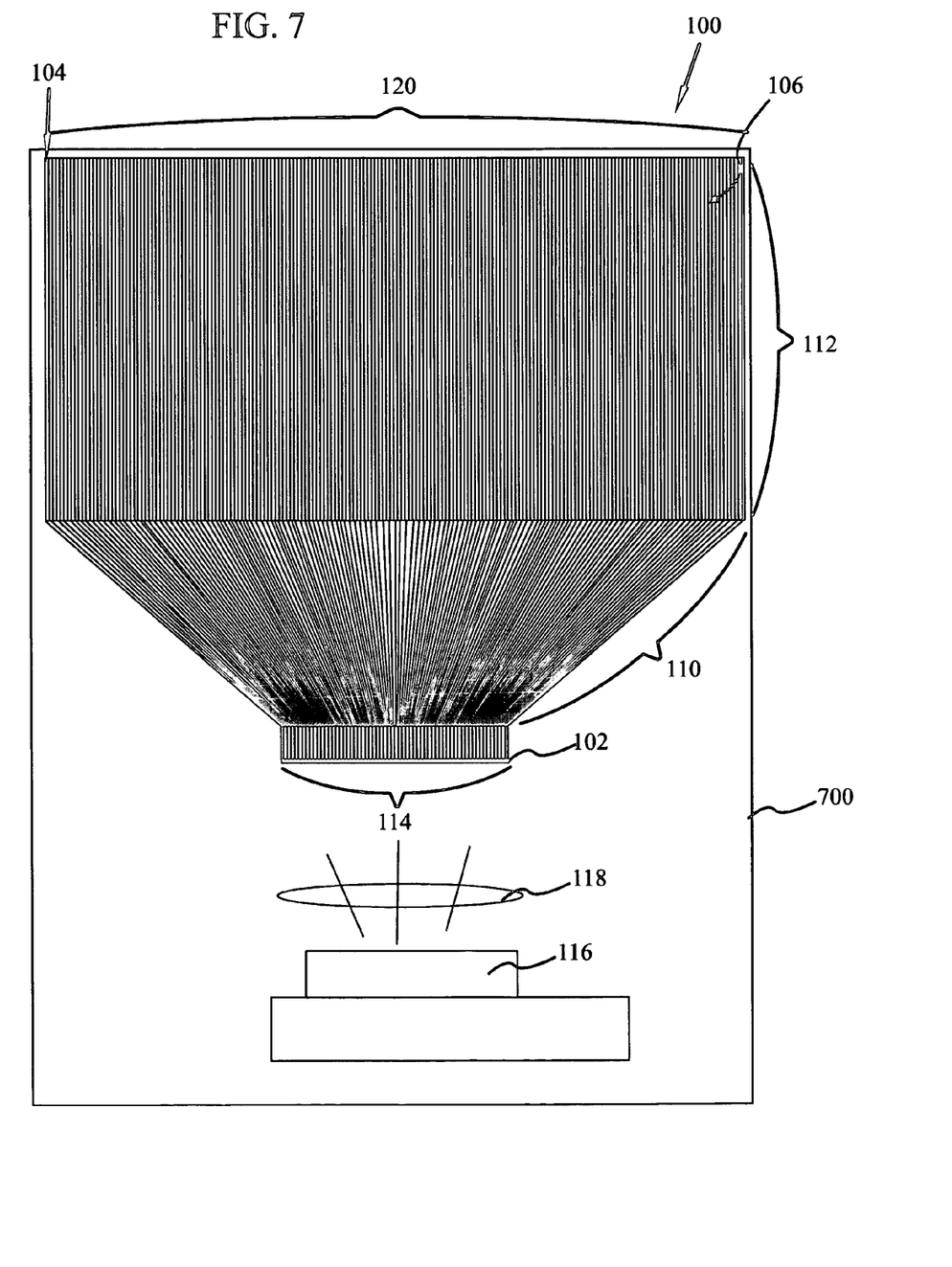
FIG. 7 shows a schematic diagram of a light guide screen with antireflection film and enclosing case according to an embodiment.

As shown in FIG. 7, by enclosing the LGS 100, antireflection film 102, at least one image source 116 and at least one lens 118 (if separate from image source 116) within a case 700, a low cost, high quality, high resolution HDTV display may be provided.

With respect to FIGS. 1 and 6, various visual image sources are known in the art. Some employ pixel systems, while others may utilize directed visible lasers or vector line plotting systems. The selection of a particular type of image source 116 is a matter of fabrication preference and the intended purpose of the LGS 100. For an HDTV embodiment, an appropriate image source 116 should be selected to render a high definition image upon the input surface 114.

The midsections 110 permit input surface 114 with antireflection film 102 to be oriented differently from viewing surface 106. In at least one embodiment, such separate alignment is advantageous in permitting a large HDTV display, such as a fifty-inch display, to have a thickness of about four inches. Depending on the cross-sectional dimensions of the light guides 200 and the resolution of the screen, LGS 100 could be thinner or thicker than four inches. Reasonable thicknesses between one and six inches could be realized for television displays.

Figure 8:
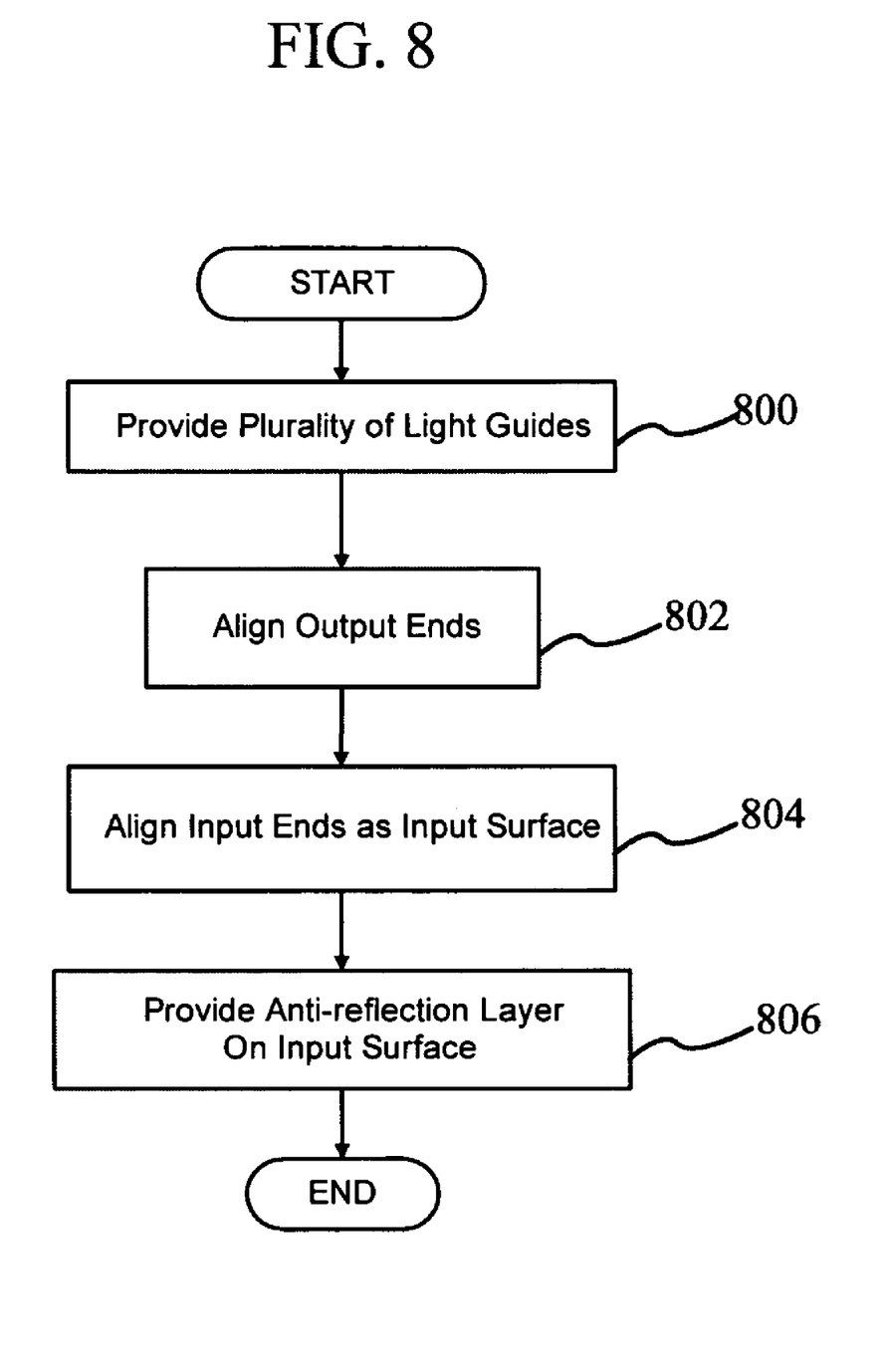
FIG. 8 is a flowchart of a method of making a light guide screen with an antireflection film in accordance with an embodiment.

Having discussed the above physical embodiments of an LGS 100 with an antireflection film 102, another embodiment relating to the method of making an LGS 100 with an antireflection film 102 will now be summarized with reference to the flowchart of FIG. 8. It will be appreciated that the described method need not be performed in the order which it is herein described, but that this description is merely exemplary of at least one method of making an LGS 100 with an antireflection film 102.

As indicated in block 800, the fabrication process commences by providing a plurality of light guides, such as light guides 200 shown in FIG. 2, each having an input end 202, a midsection 204 and an output end 206.

As shown in FIG. 2, the output ends 206 of each magnifying layer 104 are aligned, block 802. The input ends 202 of each magnifying layer 104 are also aligned, block 804. Collectively, the aligned input ends provide input surface 114.

Antireflection film 102 is then provided upon the input surface 114, block 806. As discussed above, antireflection film 102 may be a single layer of antireflection material, or it may consist of multiple thin-film layers. Antireflection film 102 may also be deposited by at least three different methods—PVD, CVD or as a laminate sheet. Antireflection film 102 is intimately coupled to input surface 114 and, in at least one embodiment, may be considered an integral part of input surface 114.

Changes may be made in the above methods, systems and structures without departing from the scope thereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A light guide display with antireflection film, comprising:
    a plurality of aligned magnifying layers providing a viewing surface, each magnifying layer including:
        a plurality of aligned light guides, each light guide having an input end, a midsection and a magnifying output end;
        the plurality of output ends aligned in substantially contiguous parallel contact as a single layer;
        the plurality of input ends aligned as an input surface; and
    an antireflection film disposed upon the input surface, the input surface is optically coupled to, and physically separate from, an image source.

2. The light guide display of claim 1, wherein the antireflection film comprises a coating.

3. The light guide display of claim 1, wherein the antireflection film comprises a layer.

4. The light guide display of claim 1, wherein the antireflection film comprises an adhesive laminate.

5. The light guide display of claim 1, wherein the antireflection film comprises a plurality of thin-film layers.

6. The light guide display of claim 1, wherein the antireflection film is intimately joined to the input surface.

7. The light guide display of claim 1, wherein the antireflection film comprises an integral part of the input surface.

8. The light guide display of claim 1, wherein the antireflection film enhances optically coupling the input surface to the image source.

9. The light guide display of claim 1, wherein the midsection is flexible.

10. The light guide display of claim 1, wherein the area of the aligned input ends is substantially less than the area of the aligned magnifying output ends.

11. The light guide display of claim 1, wherein each light guide has a longitudinal center, the input end being about perpendicular to the longitudinal center, the magnifying output end being angled relative to the longitudinal center.

12. A light guide display with antireflection film, comprising:
    a plurality of aligned magnifying layers providing a viewing surface, each magnifying layer including:
        a plurality of light guides, each light guide having an input end, a midsection and a magnifying output end;
        the plurality of input ends aligned;
        the plurality of output ends aligned in substantially contiguous parallel contact as a single layer;
        the plurality of aligned input ends aligned as an input surface;
    a louver layer coupled to the aligned magnifying ends; and an antireflection film disposed upon the input surface, the input surface is optically coupled to, and physically separate from, an image source.

13. The light guide display of claim 12, wherein the antireflection film comprises a coating.

14. The light guide display of claim 12, wherein the antireflection film comprises a layer.

15. The light guide display of claim 12, wherein the antireflection film comprises an adhesive laminate.

16. The light guide display of claim 12, wherein the area of the aligned input ends is substantially less than the area of the aligned magnifying output ends.

17. The light guide display of claim 12, wherein each light guide has a longitudinal center, the input end being about perpendicular to the longitudinal center, the magnifying output end being angled relative to the longitudinal center.

18. A light guide display with antireflection film, comprising:

a case a plurality of aligned magnifying layers disposed within the case and providing a viewing surface, each magnifying layer including:

a plurality of aligned light guides, each light guide having an input end, a midsection and a magnifying output end;

the plurality of magnifying output ends aligned in substantially contiguous parallel contact as a single layer;

the plurality of input ends aligned as an input surface;

an antireflection film disposed upon the input surface; and at least one image source disposed within the case proximate to and physically separate from the input surface, the antireflection film enhancing the optical coupling of the input surface to the image source.

19. The light guide display of claim 18, wherein the antireflection film comprises a coating.

20. The light guide display of claim 18, wherein the antireflection film comprises a layer.

21. The light guide display of claim 18, wherein the antireflection film comprises a plurality of thin-film layers.

22. The light guide display of claim 18, wherein the antireflection film comprises an integral part of the input surface.

23. The light guide display of claim 18, wherein the area of the aligned input ends is substantially less than the area of the aligned magnifying output ends.

24. The light guide display of claim 18, wherein each light guide has a longitudinal center, the input end being about perpendicular to the longitudinal center, the magnifying output end being angled relative to the longitudinal center.

25. The light guide display of claim 18, further including a louver layer coupled to the aligned magnifying output ends.

* * * * *

UNITED STATES PATENT AND TRADEMARK OFFICE
CERTIFICATE OF CORRECTION

PATENT NO. : 7,431,488 B2 Page 1 of 1
APPLICATION NO. : 11/082439
DATED : October 7, 2008
INVENTOR(S) : Steven L. Naberhuis et al.

It is certified that error appears in the above-identified patent and that said Letters Patent is hereby corrected as shown below:

In column 11, line 20, in Claim 18, after "case" insert -- ; --.

Signed and Sealed this

Twenty-fourth Day of March, 2009

JOHN DOLL
*Acting Director of the United States Patent and Trademark Office*